United States Patent
Larsen

[11] Patent Number: 5,265,654
[45] Date of Patent: Nov. 30, 1993

[54] DOSING APPARATUS AND PROCESS
[75] Inventor: Hans K. Larsen, Aestorp, Sweden
[73] Assignee: Nestec S.A., Vevey, Switzerland
[21] Appl. No.: 929,699
[22] Filed: Aug. 12, 1992

[30] Foreign Application Priority Data
Sep. 11, 1991 [EP] European Pat. Off. ........ 91115343.5

[51] Int. Cl.⁵ .......................... B65B 3/30; G01F 11/08
[52] U.S. Cl. ...................... 141/83; 141/114; 141/287; 222/1; 222/77; 222/207; 222/214; 222/387; 222/450
[58] Field of Search ............. 141/44, 46, 54, 114, 141/287, 10, 51, 59, 65, 67, 68, 83, 129, 286, 317, 1; 222/77, 386.5, 387, 389, 445, 450, 1, 212–214, 442, 447, 206–209; 414/217, 221; 251/61.1; 406/96, 128, 192, 198

[56] References Cited
U.S. PATENT DOCUMENTS

| 2,470,744 | 5/1949 | Korn | 414/221 X |
| 2,693,283 | 11/1954 | McClow | 414/221 |
| 3,063,477 | 11/1962 | Vogt | 141/59 |
| 3,224,650 | 12/1965 | Willits, Jr. | 222/214 X |
| 3,260,285 | 7/1966 | Vogt | 141/59 X |
| 3,352,605 | 11/1967 | McCandless | 406/128 |
| 3,467,151 | 9/1969 | Vogt | 141/67 |
| 3,596,688 | 8/1971 | Vogt | 141/287 |
| 4,286,910 | 9/1981 | Conrad | 414/221 |

FOREIGN PATENT DOCUMENTS
1097171 12/1967 United Kingdom ................. 141/67

Primary Examiner—J. Casimer Jacyna
Attorney, Agent, or Firm—Vogt & O'Donnell

[57] ABSTRACT

Dosing a flowable product is effected with an apparatus which has a rigid casing having a hollowed interior through which an elastic hose, which is connected to the casing, extends between casing inlet and outlet openings, and elastic rings are positioned to encircle the hose at positions adjacent each of the casing inlet and outlet openings, so that upon generation of sub- and then super-atmospheric pressure within the space between the hose and casing, the hose expands and contracts and the rings open and close the hose for product flow introduction into and ejection from the hose for dosing the product.

10 Claims, 4 Drawing Sheets

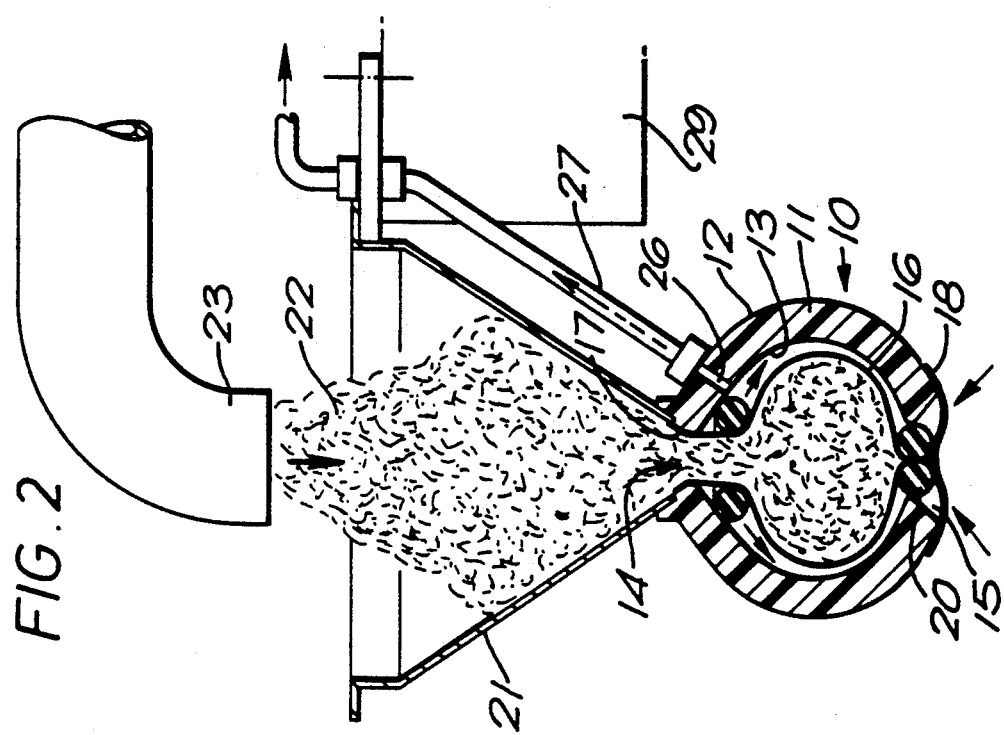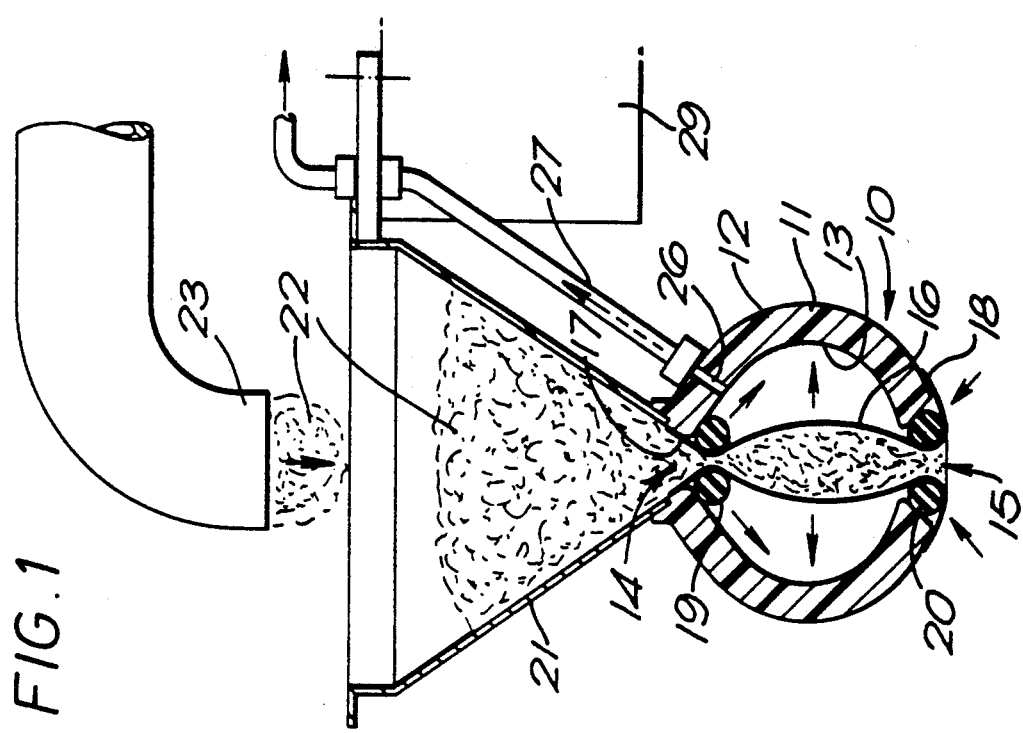

DOSING APPARATUS AND PROCESS

BACKGROUND OF THE INVENTION

The present invention relates to a filler and a process for filling products especially food products.

Conventional filling/dosing units are mainly designed to handle a specific volume, and when non-homogeneous products are filled, this often results in large weight deviations which cause economic losses. Such conventional units often are fitted with expensive pump and control systems to keep weight deviations at an acceptable level. In addition, conventional fillers often have by-corners which are difficult to clean.

SUMMARY OF THE INVENTION

The present inventions provide a filler and a process for dosing a flowable product which can provide an accurate filling weight even with non-homogeneous products and which is hygienic and easy to clean.

According to the present invention, there is provided a filler for dosing a flowable product comprising a rigid casing having an inlet and an outlet opening within which is an elastic hose whose ends are connected to the openings, means for generating super- and sub-atmospheric pressure in the space between the casing and the hose, and two elastic rings each encircling the hose adjacent an opening adapted to enable simultaneous expansion and contraction of the inlet and outlet rings respectively at the generated pressure.

The present invention also provides a process for dosing a flowable product, which may be effected by means of the filler apparatus described above, comprising generating a sub-atmospheric pressure in the space between the casing and the hose causing the hose and the inlet ring to expand and the outlet ring to contract, whereby the inlet opens and the outlet closes enabling product to be sucked into the hose, and then generating a super-atmospheric pressure in the space between the casing and the hose causing the hose and the inlet ring to contract and the outlet ring to expand, whereby the outlet opens and the hose and the inlet ring contract so that product is ejected out of the filler.

DETAILED DESCRIPTION OF THE INVENTION

In the present invention, the rigid casing may be made of metal or a rigid plastics material such as PVC. The elastic hose may conveniently be made of rubber or a flexible plastics material, e.g., silicone. The wall of the hose preferably has a thickness of from 0.1 to 1.0 mm.

Conveniently, the inlet opening is positioned at the upper end of the casing and the outlet opening at the lower end.

The ends of the flexible hose may conveniently be connected to the casing adjacent the openings, for instance by a clamp or by means of a suitable adhesive, such as glue.

The means for generating super- or sub-atmospheric pressure may be provided by a compressed air and vacuum ejector unit positioned outside the casing and connected to the interior of the casing by means of a pipe and an aperture in the wall of the casing.

In order to achieve simultaneous expansion and contraction of respective rings at the generated pressure, the ring at the inlet may be positioned internally and the ring at the outlet may be positioned externally of the interior wall of the casing, while the circumference of each ring in the contracted state is greater than the circumference of the openings at the interior wall of the casing.

Means for feeding product to the inlet opening is provided, for instance by a hopper, which preferably has a volume larger than the casing. Means for supplying product to the hopper, such as a pump may also be provided.

Weighing means may also be provided together with a control means to ensure that a desired weight of product is ejected from the filler. A suitable weighing means is a load cell adapted to weigh the filler and the hopper before and after the product is ejected from the filler. The control means may conveniently be a signal processor which controls the signals from the load cell by sensing the mass several times per second and can control the desired weight of product ejected from the filler according to set point adjustment (negative weighing).

A conveyor may also be provided to transport containers consecutively beneath the filler, the conveyor being adapted to travel intermittently so that it stops while a container is positioned immediately below the filler for filling.

The invention has the following advantages:

1) There need not be any after-running from the hose when the sub-atmosphere pressure is generated at exactly the same moment as the set point is reached.

2) By using a load cell which, in the range of 0-5 kg, has a maximum deviation of 0.03%, it is possible to obtain closed products with extremely small weight deviations.

3) There is no need for a specific or accurate pump for transport of the product to the hopper; a simple membrane pump can be used.

4) Products containing large particles can pass through the hose since the rings, which act like valves, form themselves according to the product and there is no contact between the rings and the product.

5) The elasticity of the rings also produces a very efficient closing of the inlet and outlet openings.

6) The equipment is very hygienic and easy to clean, as there are no by-corners. Only the smooth interior walls of the hose and the hopper contact the product.

Food products which may suitably be dosed by the filler of this invention include low and high viscosity sauces/fillings with pieces of onion, mushroom, tomato or ham, or various kinds of jam containing whole berries. The present invention is illustrated by way of example with reference to the accompanying drawings.

BRIEF DESCRIPTION OF THE DRAWINGS

FIGS. 1-4 are side sectional diagrammatic views of a filler according to the invention in four consecutive phase sequences.

DETAILED DESCRIPTION OF THE DRAWINGS

Figure 4:
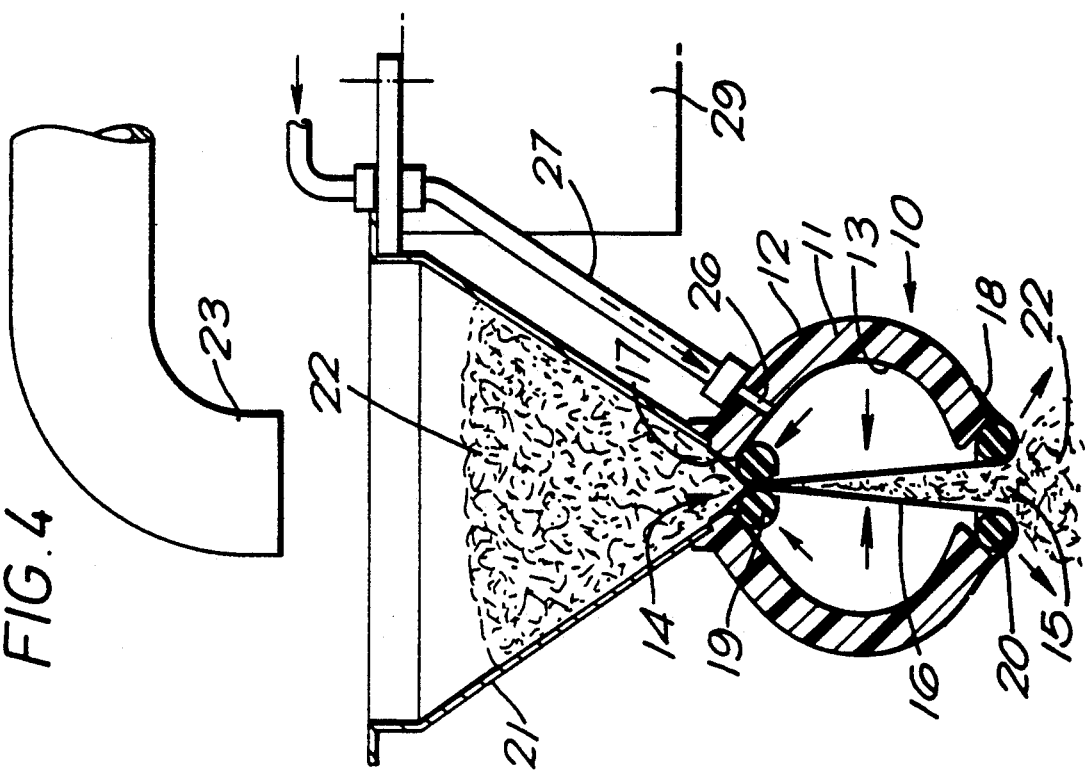
Figure 3:
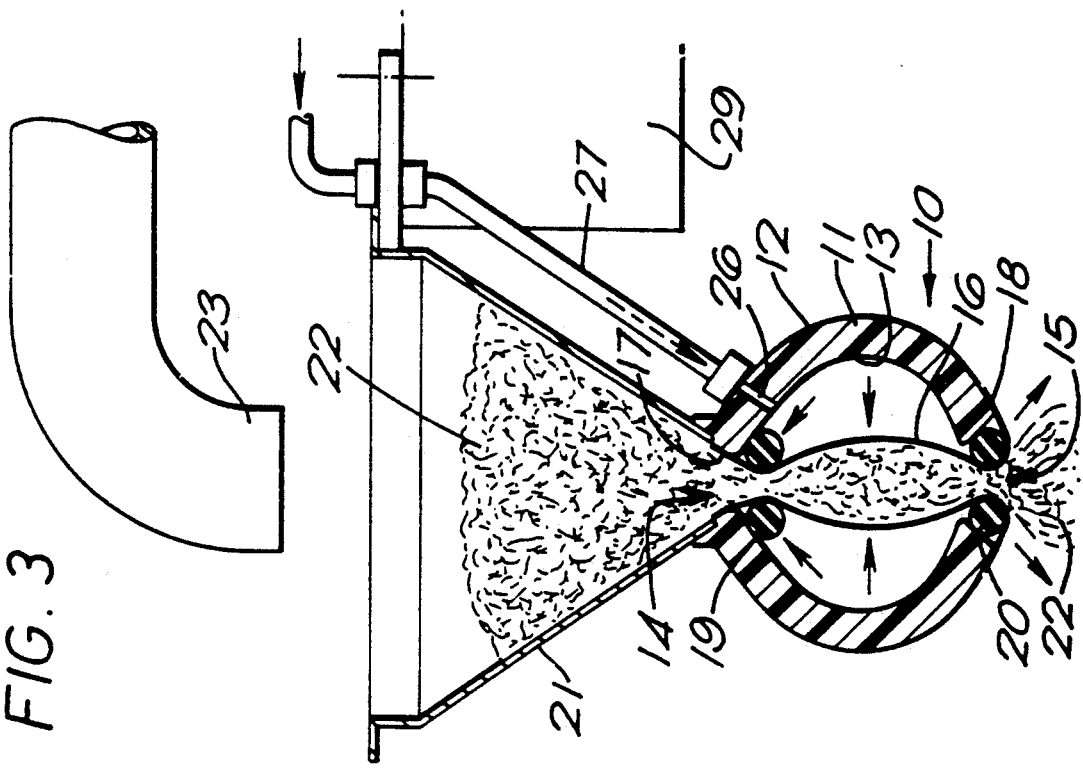

Referring to the drawings, the filler generally designated 10 comprises as illustrated, in particular, in FIGS. 1-4, a rigid case 11 having an exterior wall 12 and an interior wall 13 and provided with an inlet opening 14 and an outlet opening 15. Interior wall 13 defines a hollowed casing interior, and openings 14 and 15 are defined by casing edge surfaces which extend from interior wall 13. Inside the casing is a thin soft rubber hose 16, which extends through the hollowed casing interior from the casing inlet and outlet openings and has hose portions connected to the casing, one end of which (17) is glued to the wall of the casing at the inlet opening 14 and the other end of which (18) is glued to the exterior wall 12 of the casing at the outlet opening to seal off a space between the hose and interior wall 13.

Encircling the ends of the hose 16 are elastic rubber rings 19, 20 which can expand and contract and which, when contracted, close the openings at the ends of the hose. Rubber ring 19 is positioned internally of and abutting the interior wall 13 of the casing at the inlet opening 14, and the rubber ring 20 is positioned externally of the interior wall 13 of the casing abutting the outlet edge surface which is flared in a direction away from the interior wall to define a flared outlet openings 15. In operation, upon application of sub- and super-atmospheric pressure, the rings bear against the abutting casing surfaces, and the circumference of each rubber ring in the contracted closed state is greater than the circumference of the openings at the interior wall 13 of the casing.

A buffer hopper 21 containing a food product 22 is connected to the upper inlet opening 14 and holds a volume of food product somewhat larger than the volume of the casing. Above the hopper 21 is mounted the outlet 23 from a membrane pump 24 for pumping the product from a product source 25.

Figure 6:
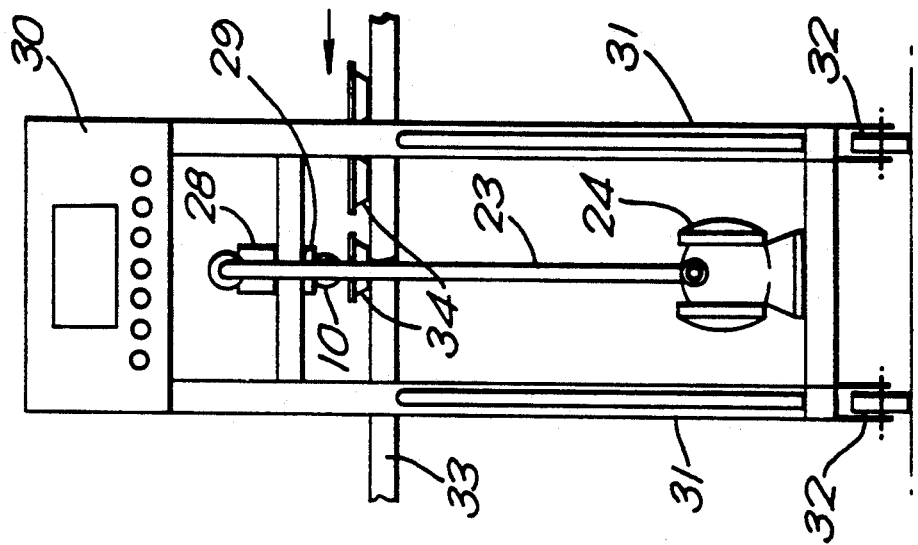
FIG. 6 is a view of FIG. 5 along the, line A—A looking in the direction of the arrows.
Figure 5:
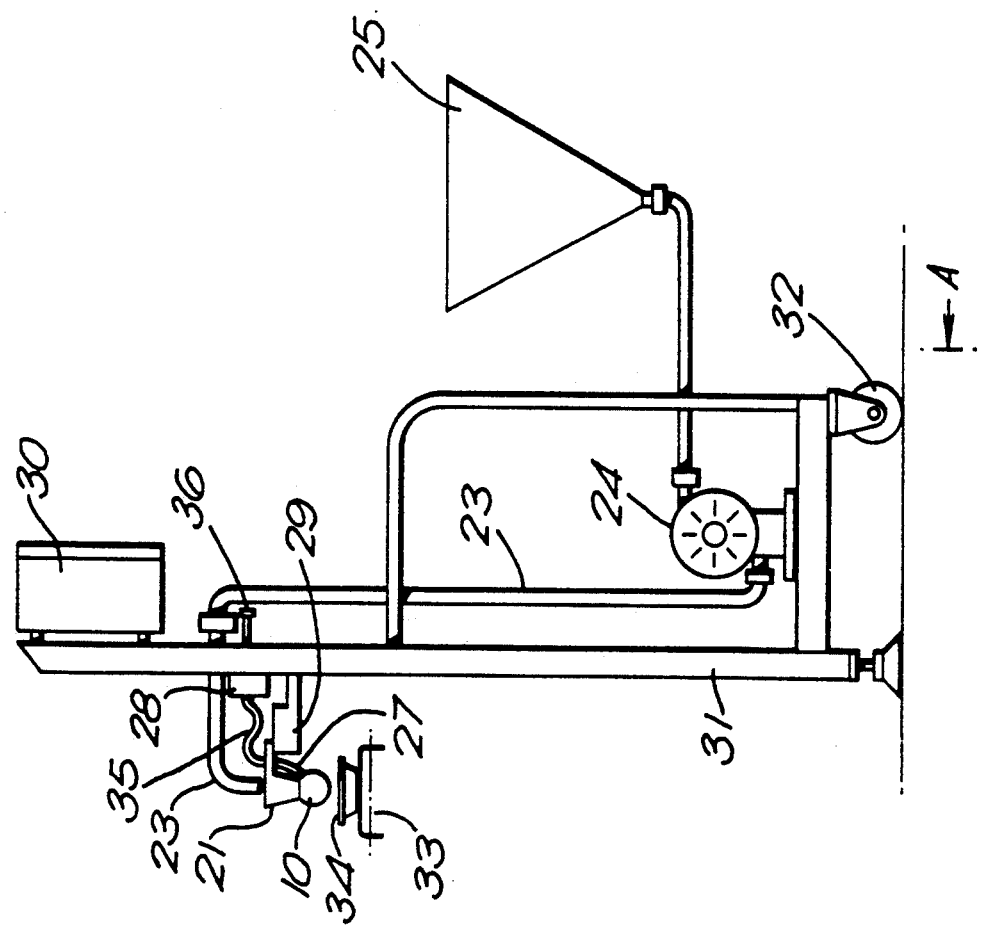
FIG. 5 is a side plan view of a unit incorporating a filler according to the invention.

The casing 11 is provided with an aperture 26 to which is connected a pipe 27 used for introducing super- and sub-atmospheric pressure from a compressed air and vacuum ejector unit 28 (FIGS. 5 and 6). The compressed air and vacuum ejector unit 28 is connected to pipe 27 by means of a soft flexible tube 35 and to the compressed air supply by means of connection 36. As also illustrated in FIGS. 5 and 6, the hopper 21 and the filler 10 are suspended in a load cell 29 for weighing, and a signal processor 30 controls the weight. A portable unit is provided with a frame 31 on wheels 32 and a conveyor belt 33 is provided to transport containers 34 to a position beneath the filler 10.

Figure 7:
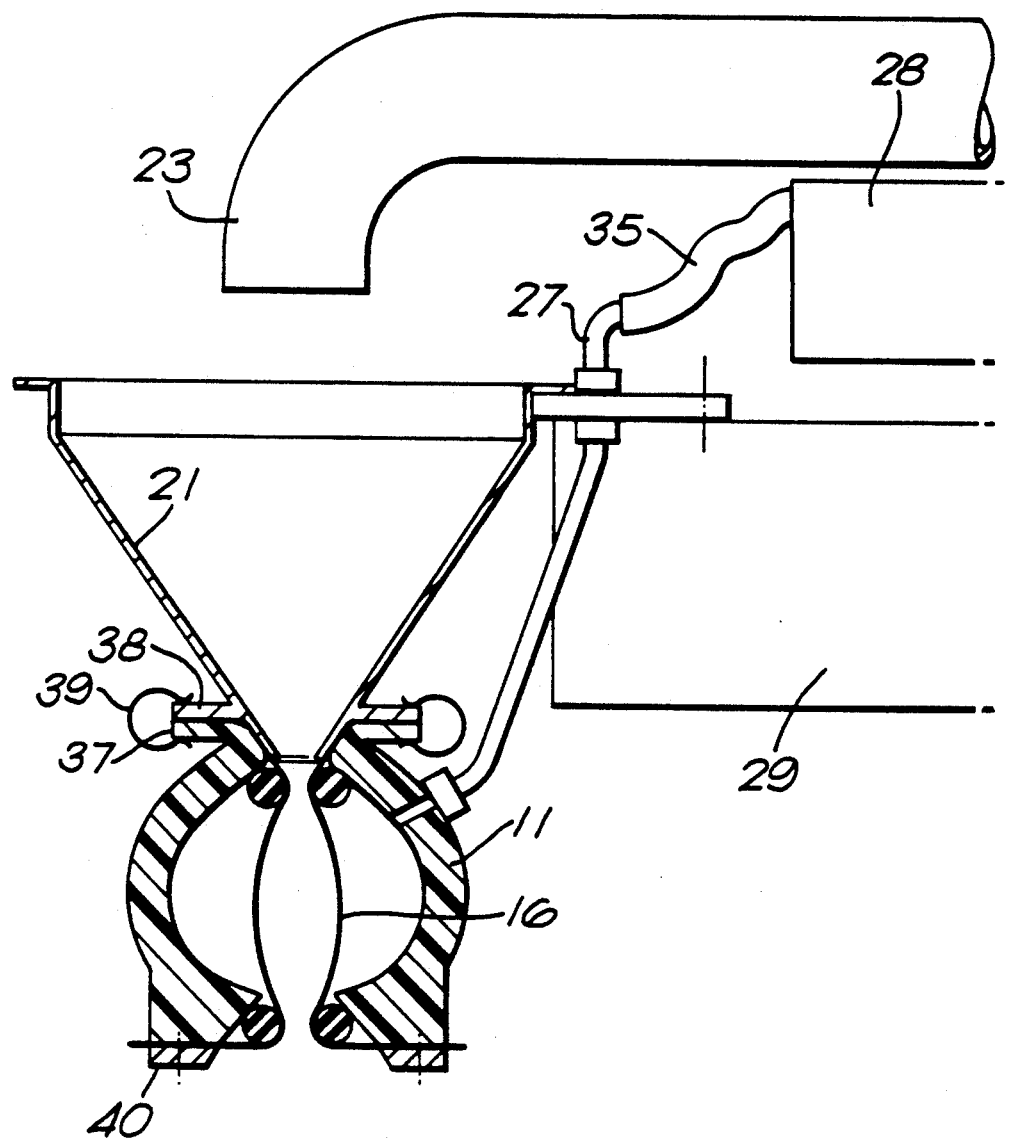
FIG. 7 is a side sectional diagrammatic view of a filler showing an alternative way of connecting the hose to the casing.

In FIG. 7, the upper end of the casing 11 is provided with a flange 37 fitted to a flange 38 at the lower end of the hopper 21 by springing clamps 39. The upper end of the hose 16 is clamped between flanges 37 and 38. The lower end of the hose is clamped between the casing and a flanged ring 40.

In operation, the dosing occurs in the sequence phases shown in FIGS. 1 to 4. In FIGS. 1 and 2, a vacuum is generated by the compressed air and vacuum ejector unit 28, drawing air out of the space between the hose 16 and the casing 11 through aperture 26 causing the ring 19 and the hose to expand, thus opening the inlet end 17 of the hose allowing product 22 to be sucked into the hose 16 from the buffer hopper 21. Simultaneously, the ring 20 contracts thus closing the outlet end 18 of the hose, and an amount of product similar to that sucked into the hose is pumped from the membrane pump 24 into the buffer hopper 21. The filler, hopper and food product contained therein are weighed by the load cell 29, and the total mass is registered on the signal processor 30. When this cycle has been completed superatmospheric pressure is generated (FIGS. 3 and 4) by the compressed air and vacuum ejector unit 28 and passes via the soft flexible tube 35 and pipe 27 through the aperture 26 into the space between the hose 16 and the casing 11 causing the ring 19 and the hose to contract, thus closing the inlet end 17 of the hose and simultaneously causing the ring 20 to expand, thus opening the outlet end 18 of the hose and, consequently, causing food product 22 to be ejected from the hose.

The desired amount of product ejected from the hose is achieved according to a set point adjustment (negative weighing) of the signal processor which senses the weight several times per second during the ejection stage until the set point is reached. At the very moment that the set point is reached, the cycle is repeated, whereby a vacuum is generated causing any product in the outlet opening to be sucked back into the hose before the ring 20 closes.

During the process, the conveyor belt 33 carrying containers 34 (FIGS. 5 and 6) travels intermittently and stops when a container is beneath the filler 10 to be filled with food product ejected from the filler before continuing.

I claim:

1. An apparatus for dosing a flowable product comprising:
   a rigid casing having an interior wall surface which defines a hollowed casing interior and having casing edge surfaces which extend from the interior wall and define a casing inlet opening and define a casing outlet opening which is flared in a direction away from the interior wall;
   a elastic hose which extends through the hollowed casing interior from the casing inlet and outlet openings and which has portions connected to the casing to seal off a space between the hose and the interior wall;
   means for generating sub- and super-atmospheric pressures in the space between the interior wall and hose; and
   a first elastic ring which encircles the hose at a position adjacent the inlet opening and abutting the casing interior wall surface and a second elastic ring which encircles the hose at a position exterior of the casing interior wall and abutting the casing opening outlet edge surface so that upon application of sub- and then super-atmospheric pressure, the rings bear against the abutting casing surfaces and operate to open and close the hose to flow of a flowable product.

2. An apparatus according to claim 1 wherein the means for generating sub- and super-atmospheric pressure is a compressed air and vacuum ejector unit connected to the hollowed interior of the casing by a pipe connected to an aperture through the casing.

3. An apparatus according to claim 1 wherein one hose portion is connected to the casing inlet opening surface and a second hose portion is connected to an exterior wall of the casing adjacent the outlet opening.

4. An apparatus according to claim 1 further comprising a hopper positioned adjacent the casing inlet opening for feeding a flowable product to the hose for being fed through the hose.

5. An apparatus according to claim 4 wherein the hopper has a volume larger than a volume of the hollowed interior of the casing.

6. An apparatus according to claim 4 further comprising weighing means to weigh the hopper and the casing, hose and rings and flowable product and control means to control an amount of product ejected.

7. An apparatus according to claim 6 wherein the weighing means is a load cell and the control means is a signal processor.

8. The apparatus according to claim 4 further comprising a flange fitted to the casing and a flange fitted to the hopper for connecting the hopper adjacent to the casing and for connecting a hose portion to the casing between the flanges.

9. A process for dosing a flowable product comprising generating a sub-atmospheric pressure in a space in a hollowed casing surrounding an elastic hose which extends between two elastic rings, wherein a first ring encircles the hose at adjacent a casing inlet opening and wherein a second ring encircles the hose at a casing outlet opening, so that the hose and the first ring form a hose opening and so that the hose and the second ring form a hose closure, and introducing a flowable product into the hose through the opening, and then, generating a super-atmospheric pressure in the space so that the hose and first ring form a hose closure and so that the hose and second ring form a hose opening for ejecting the product from the hose.

10. A process according to claim 9 further comprising controlling the amount of product ejected according to set point adjustment.

* * * * *